Patented Feb. 2, 1937

2,069,194

UNITED STATES PATENT OFFICE 2,069,194

GAS PURIFICATION MATERIAL

Joseph W. Ayers, Easton, Pa., assignor to C. K. Williams & Co., Easton, Pa., a corporation of Pennsylvania No Drawing. Application July 28, 1933, Serial No. 682,633

8 Claims. (Cl. 252—2.5)

This invention relates to gas purification and more specifically to the removal of hydrogen sulfide from commercial gases by means of a novel composition containing hydrated ferric oxide and calcium sulfate or other soluble sulfate, the former entering into reaction with the hydrogen sulfide and the latter serving as an activator therefor by increasing the speed of its reaction as well as its actual capacity of reaction with the hydrogen sulfide. The invention also includes (as new compositions of matter) mixtures of the oxide and sulfate, either alone or together with other materials hereinafter described, and in addition includes methods of compounding these mixtures.

The principal object of the invention is to provide a gas purification composition which is more efficient than the compositions for the same purpose heretofore known and commercially available, and which is producible from cheap raw materials or from by-products of various industries.

The preferred embodiment of the process of producing the composition of the present invention comprises reacting scrap iron with dilute sulfuric acid to form ferrous sulfate, separating the ferrous sulfate from the water of the solution, oxidizing it to ferric sulfate by roasting in the presence of air, forming an aqueous solution of the ferric sulfate, adding thereto a solution of calcium hydroxide in combining proportions thereby forming a reaction mass composed of hydrated ferric oxide and calcium sulfate, and removing substantially all or a portion of the physically admixed water as by settling and decanting. The reaction occuring is as follows:

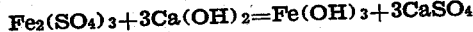

Instead of reacting scrap iron with sulfuric acid spent pickling liquor, or any other by-product source of ferrous sulfate or ferric sulfate may be used.

The precipitated oxide and sulfate composition is prepared for use in the gas purification apparatus, either by being distributed on a material suitable as an absorption sponge such as wood shavings, blast furnace slag, or the like, or by being suspended in the usual manner in contact solutions as sometimes used for the absorption of hydrogen sulfide from commercial gases. The proportion of the composition which should be mixed with the sponge material depends upon the percentage of hydrogen sulfide in the gas to be purified and the amount of gas to be purified by the sponge material per day.

Whereas it is preferred to employ calcium hydroxide to react with the ferric sulfate to form the composition of the present invention, other bases which form soluble sulfates, such as those of the alkali and alkaline earth metals and ammonia can be used with more or less success.

When it is desired to produce a composition having a larger percentage of iron oxide than obtainable by the reaction of ferric sulfate and calcium hydroxide in combining proportions as hereinbefore described, part of the hydroxide may be substituted by a quantity of sodium carbonate or other base adapted to form a more soluble sulfate, the soluble sulfate produced being removed wholly or in part by washing.

The presence of a small amount of lime or alkali in gas purification sponges or contact solutions is in some instances beneficial in neutralizing the sulfuric acid formed by oxidation of the sulfur produced by the reaction between the hydrogen sulfide and the ferric oxide. Lime may be satisfactorily introduced into the composition of the present invention by employing a quantity of calcium hydroxide slightly in excess of that amount which reacts with the iron salt, thereby leaving a portion of unreacted lime in the final product. It should be understood, however, that the presence of lime in the composition is not usually necessary. When the sponge containing free lime is used in the gas purification process, it is desirable to introduce a small quantity of air together with the impure gases.

The composition produced by the reaction of the iron salt and the hydroxide in combining proportions as hereinbefore described has about 30% iron oxide calculated as $Fe_2O_3$ and about 70% calcium sulfate. When this composition is suitably deposited on wood shavings or the like and properly moistened, its capacity for absorbing hydrogen sulfide is equal to other commercial gas purification oxide materials containing 60% iron oxide, as $Fe_2O_3$. As the material of my invention is capable of reacting to the full capacity of the iron oxide present, whereas prior materials do not have this capacity.

The rate of reaction of the hydrated iron oxide of the composition with the hydrogen sulfide in the gas being purified is at least equal to that of the best of other commercial gas purification oxide materials which often contain a higher percentage of iron oxide but in a form not readily available to go into reaction with the hydrogen sulfide.

The proportion of hydrated iron oxide to the calcium sulfate may vary within wide limits, the suitable range not being limited by the proportions resulting from the preferred method of production hereinbefore described. Additional portions of either ingredient may be added. For best results the proportion of iron as Fe₂O₃ in the oxide sulfate mixture should not be less than about 28%. Additional capacity is obtained by increasing the proportion of iron oxide but the additional expense often does not warrant its use. Generally, a larger proportion than about 40% will not be employed.

The action of the calcium sulfate or other sulfate appears to be catalytic in speeding up the reaction between the hydrated iron oxide and the hydrogen sulfide. The greater capacity of the oxide to react with the sulfide may also be due to the catalytic action of the sulfate, it may be due to the physical condition of the oxide in the mixture.

The most economical source of the composition of the present invention is found in the iron oxide pigment industry wherein iron scrap is reacted with sulfuric acid to form ferrous sulfate which product is then roasted and oxidized to form insoluble red iron oxide, a portion of the ferrous sulphate unavoidably changing to ferric sulfate. The ferric sulfate is objectionable in the pigment and is dissolved out by washing. The resulting wash solution may then be treated with calcium hydroxide in the manner hereinbefore described to produce the mixture of hydrated iron oxide and calcium sulfate. The mixture can be suitably separated from excess water by settling and decanting.

The iron oxide-sulfate composition may be deposited on wood shavings by merely putting them into a suitable agitator together with sufficient water to thoroughly wet the shavings and agitating until a homogeneous mass is obtained. For general use, a sponge of satisfactory properties is obtained by mixing about 15 pounds of the composition to each bushel of wood shavings used.

The sponge produced according to this process may be revivified after use by any of the well known methods for oxidizing the ferric sulfide to ferric oxide. If the gases being purified are properly cleaned for removal of tar, the present sponge will not cake upon revivification.

It should be understood that the instant invention is not limited to the details of the above disclosure either as to materials or proportions, but is limited only by the scope of the claims appended hereto.

I claim:

1. A composition for the purification of gas by removal of hydrogen sulfide consisting of an absorption sponge containing hydrated iron oxide and calcium sulfate, the proportion of the oxide in the oxide sulfate mixture being not less than about 28%, as Fe₂O₃, said hydrated iron oxide-sulfate mixture having been produced by leaching a calcined mixture of red iron oxide and ferric sulfate and precipitating the iron content in the solution as hydrated iron oxide by reaction with calcium hydroxide.

2. A composition for the purification of gas by removal of hydrogen sulfide, consisting of hydrated iron oxide and calcium sulfate deposited on wood shavings, the proportion of oxide in the oxide sulfate mixture being within about 28% to 40%, as Fe₂O₃, said mixture of hydrated iron oxide and calcium sulfate being produced as a by-product in the conventional calcining method of producing red oxide of iron for pigment purposes.

3. The process of producing a gas purifying composition comprising forming an aqueous solution of ferric sulfate by leaching a calcined ferrous sulfate mass containing red oxide of iron pigment and ferric sulfate, adding an alkaline solution whereby hydrated iron oxide and a soluble sulfate are formed and separating excess water.

4. The process of producing a gas purifying composition comprising reacting iron with dilute sulfuric acid to form ferrous sulfate, oxidizing the same to ferric sulfate, forming an aqueous solution of said ferric sulfate, adding calcium hydroxide to said solution thereby forming a reaction mixture of hydrated iron oxide and calcium sulfate, separating any excess water, and then depositing the resulting mixture upon an absorption sponge.

5. A composition for the purification of gas by removal of hydrogen sulfide, producible from a by-product obtained in the iron oxide pigment industry which consists of a reaction mixture derived from a solution of ferric sulfate leached from a mixture of said sulfate with red iron oxide, and composed of hydrated ferric oxide and calcium sulfate, the proportion of oxide to the sulfate being from about 28% to 40%, as Fe₂O₃, said mixture being deposited upon wood shavings.

6. The method of utilizing waste mixtures of hydrated iron oxide and calcium sulfate resulting from the conventional method of producing red oxide of iron pigments by calcining ferrous sulfate, leaching and precipitating with lime, which comprises agitating a portion of the mixture in wet condition with an absorption sponge until the mixture deposits uniformly upon the sponge, and removing the homogeneous mixture from the agitating means, said mixture constituting a composition suitable for the purification of gas by removal of hydrogen sulfide.

7. A composition for the purification of gas by removal of hydrogen sulfide having an iron content consisting of hydrated iron oxide, a small amount of alkali sufficient only to neutralize sulfuric acid formed during use in the gas purification, and calcium sulfate, said hydrated iron oxide-sulfate mixture being produced as a by-product in the red oxide of iron pigment industry, said materials being deposited on an absorption sponge.

8. A composition for the purification of gas by removal of hydrogen sulfide having an iron content consisting of hydrated iron oxide and a soluble sulfate produced as a by-product in the red oxide of iron pigment industry, said iron oxide-sulfate mixture being deposited upon an absorption sponge.

JOSEPH W. AYERS.